(No Model.)

A. V. ABBOTT.
TESTING MACHINE.

No. 383,385. Patented May 22, 1888.

(No Model.) 10 Sheets—Sheet 8.

A. V. ABBOTT.
TESTING MACHINE.

No. 383,385. Patented May 22, 1888.

(No Model.)   10 Sheets—Sheet 10.

A. V. ABBOTT.
TESTING MACHINE.

No. 383,385.   Patented May 22, 1888.

Fig. 15.   Upper head.

Fig. 16.   C   Lower head.

Witnesses:   Inventor:
   Arthur V. Abbott.
   by Chas. M. Higgins.
   Attorney.

N. PETERS, Photo-Lithographer, Washington, D. C.

UNITED STATES PATENT OFFICE.

ARTHUR V. ABBOTT, OF BROOKLYN, NEW YORK, ASSIGNOR TO E. & T. FAIRBANKS & COMPANY, OF ST. JOHNSBURY, VERMONT.

TESTING-MACHINE.

SPECIFICATION forming part of Letters Patent No. 383,385, dated May 22, 1888.

Application filed January 8, 1884. Serial No. 116,761. (No model.)

*To all whom it may concern:*

Be it known that I, ARTHUR V. ABBOTT, of Brooklyn, Kings county, New York, (assignor to E. & T. FAIRBANKS & COMPANY, of St. Johnsbury, Vermont,) have invented certain new and useful Improvements in Testing-Machines, of which the following is a specification.

My invention relates more especially to that class of testing-machines for tensile and lateral strains, more particularly the former, in which the specimen is held between two clamp-heads, one of which bears on weighing mechanism, while the other is driven by straining mechanisms until the specimen is broken, when the weighing mechanism will show the strain which was exerted up to the moment of the break.

As my invention is somewhat elaborate, I will therefore first give a general outline or introductory idea thereof before proceeding to the general description, so that the latter will be more readily comprehended when reached.

In my present invention I employ weighing mechanism substantially the same as that of a large Fairbanks platform-scale, such as has been heretofore used in testing-machines, and I employ straining mechanism similar in its main features to that heretofore used. The novel features of my machine, however, lie mainly in the means for recording the strength and stretch of the specimen, in the means for moving the poises on the scale-beam which regulate the application of the strain, the means for stopping the machine when the specimen breaks, and also in the details of the clamp-heads and devices for holding the specimen, &c.

The main object of my invention is to automatically control the movements of various parts of the machine by electricity, and to accurately record the strain which the specimen endures and the stretch which it undergoes up to the moment of break, and to produce automatically a graphic record or diagram of this strain and stretch for comparison. In carrying out these objects I employ peculiar electrical devices in connection with several parts of the machine to control and regulate the movements thereof according to the action of the specimen and movements of the scale-beam—that is, I employ an electric circuit which passes through the specimen under test, and in this circuit is included a number of electro-magnets or other electric-motor devices which effect different offices or act on different parts of the machine. One of these devices controls the belt-shipper or other means whereby power is applied to the straining mechanism, so that as soon as the specimen breaks the circuit is broken and the straining mechanism thereby stopped. Another one of these electrical devices operates or releases a clock-work or other motor which propels the poises in or out upon the beam, and also revolves a recording-drum whose circumferential motion represents the advance of the poise, and consequently the strain applied to the specimen. Part of the circuit of these poise-operating devices passes through contacts operated by the rise and fall of the beam, and which contacts will thus divert the current to one or other of the electric devices or magnets, which will cause the poise to advance or retire, according as the beam rises or falls. On each end of the specimen is fixed a small clamp with knife-edges, and the lower one of these clamps carries a small electro-magnet arranged in the general circuit, and to the attracted armature, of which magnet is fixed one end of a tape, which passes over a pulley on the upper clamp, and thence connects to a sliding pen or marker adapted to move longitudinally along the periphery of the recording-drum; hence any stretch of the specimen will pull upon the tape and advance the marker along the drum, so that as the drum revolves under the marker and the marker moves longitudinally on the drum a line will be marked on the drum whose circumferential direction will show strain, while its lateral or longitudinal direction will indicate stretch, thus producing a graphic record of the test. When the specimen breaks, the general circuit will be broken, the tape will be at once released by its holding-magnet, the straining mechanisms will be instantly stopped, and the drum and other devices come to rest simultaneously with said break.

The main features of my invention therefore consist in the points above outlined, as hereinafter fully set forth and claimed.

In the drawings annexed, Figure 1 gives a general side or longitudinal elevation of my improved machine. Figs. 15 and 16 are plan views of the upper and lower clamp-heads, respectively. Fig. 17 is a side elevation of the spherical clamp-socket and wedging clamp-jaws removed from the bed, and Fig. 18 a plan of the same. Fig. 19 shows plans of different form of wedging clamp-jaws adapted for specimens of different forms. Fig. 20 is a sectional view of one of the spherical clamp-sockets with wedges shown holding a channel-iron, and Fig. 21 is a plan view thereof. Fig. 22 is a section of Fig. 21 on the line $o$ $o$ thereof.

Referring to the drawings, it will be seen that the machine is similar in general plan to a Fairbanks platform-scale for heavy work, with one clamp-head bearing upon the platform of the scales and the other clamp-head supported and driven from the fixed framework of the scales. The lever and beam mechanism supporting the platform and conveying the weight thereof to the graduated scale-beam is substantially the same as employed in a Fairbanks scale.

Referring, therefore, to the main views in Figs. 1, 2, 3, and 4, the general construction of the frame-work, levers, and main parts of the machine will be readily understood.

$a$ $a$ indicate strong side frames or base-castings, which form the base portion of the fixed frame and have broad feet $a'$, as shown, which are bolted to a suitable flooring or foundation. These side frames are joined rigidly near each end by a pair of iron girders, $b$ $b$. Between each pair of said girders are pivoted the main platform-levers $c$ $c$, which, as usual in a platform-scale, are four in number, corresponding to the four corners of the platform. An end view of two of the levers on the near side of the machine is shown in Fig. 1, and an end view of the two on the front side is shown in Fig. 3, while a side view of the same is shown in Fig. 4.

Figure 1:
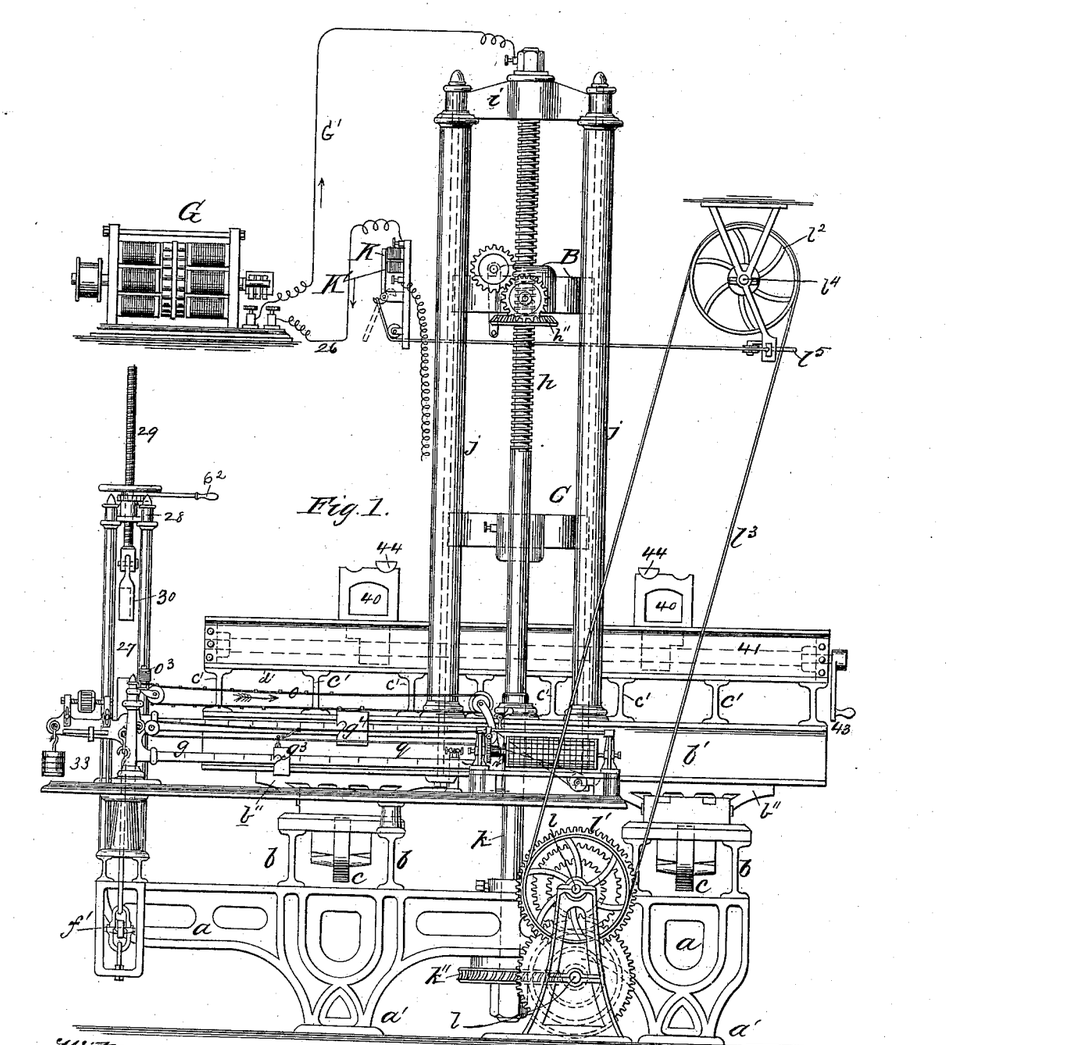
Figure 2:
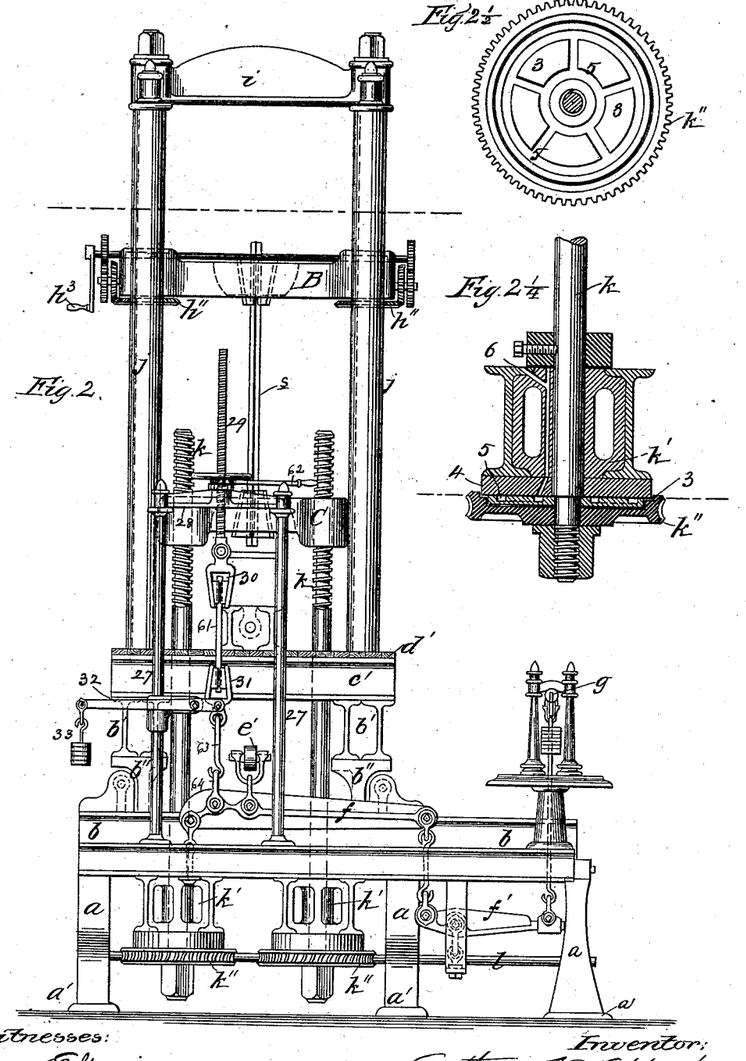
Fig. 2 is an end elevation.
Figure 3:
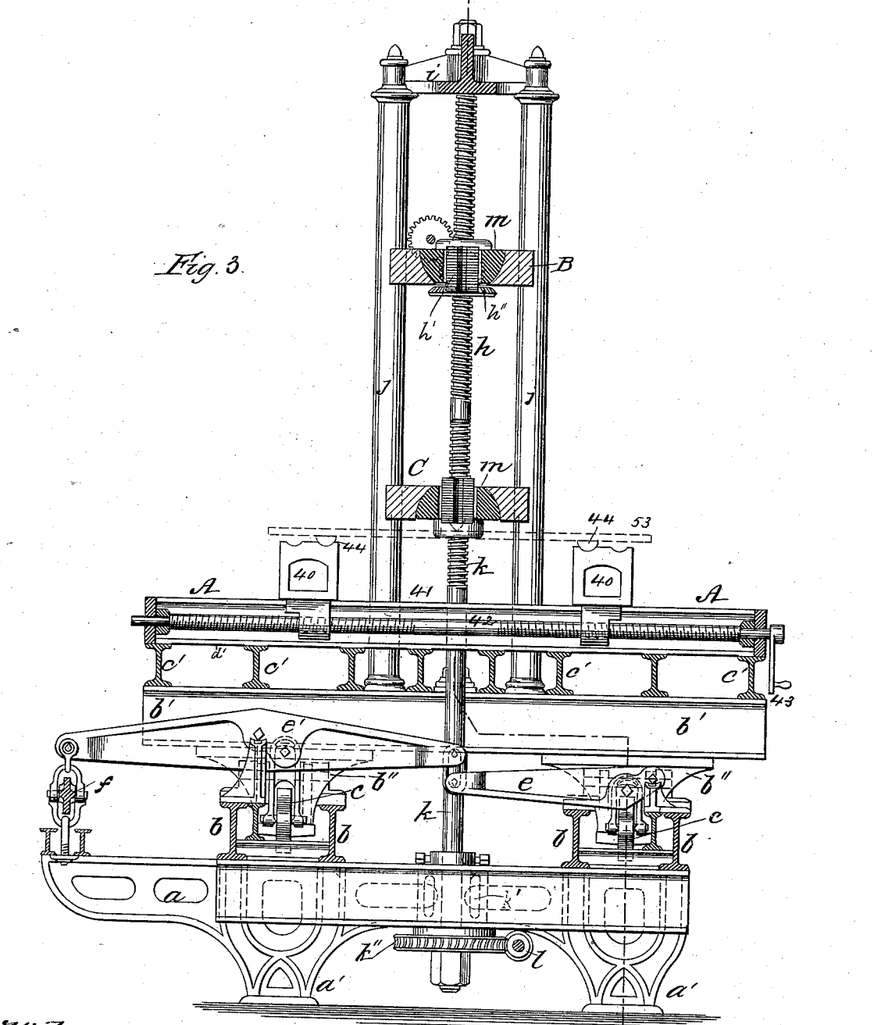
Fig. 3 is a longitudinal central section.
Figure 4:
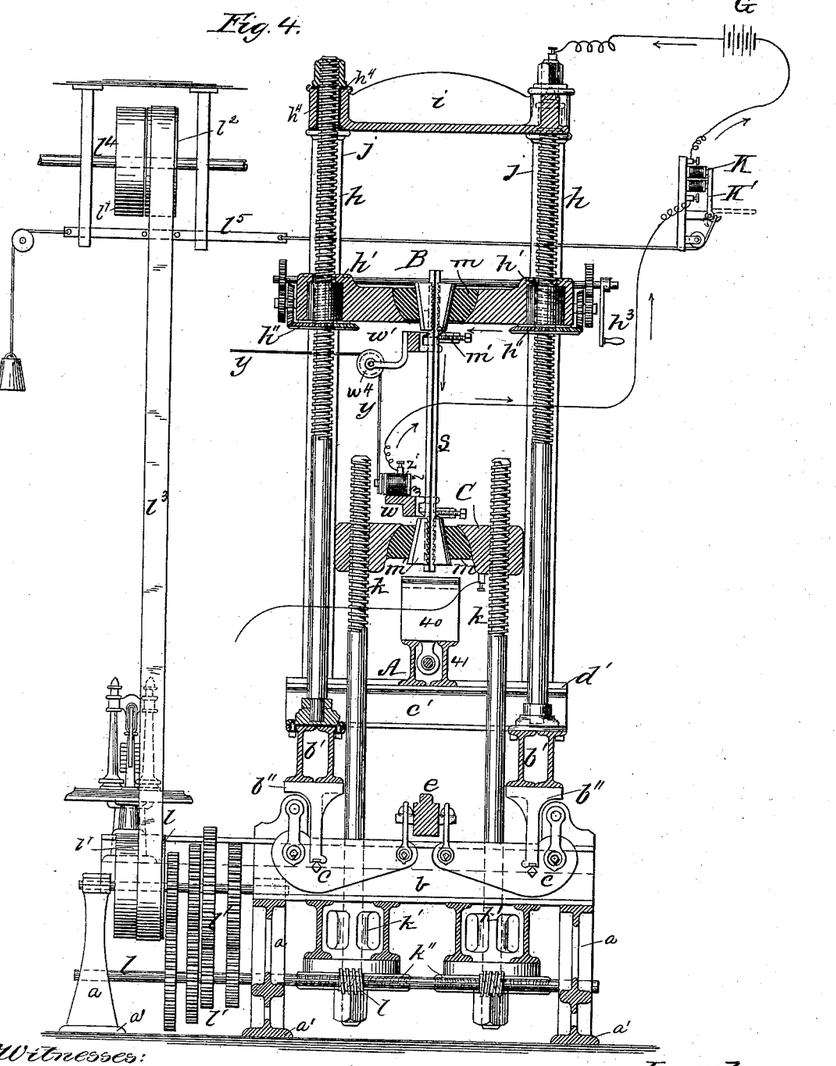
Fig. 4 is a central cross-section.

Now, A indicates the platform of the machine, which is founded on two pairs of iron I-beams or girders, $b'$ $b'$, which are set close together at each side of the platform and run parallel with the fixed side frames, $a$ $a$, as fully shown in Figs. 1, 3, and 4. To the top of these foundation-girders $b'$ $b'$ is securely bolted a transverse series of I beams, $c'$, and over the said beams is laid a light flooring, $d'$, of wood, as shown best in Figs. 2 and 4. To the under side of the foundation-girders $b'$ strong castings or bearing-blocks $b''$ are secured and depend therefrom beneath the four corners of the platform, straddling the platform-levers $c$ $c$ $c$ $c$ and bear upon the bearing-points thereof, thus supporting the platform directly upon the said levers. The free ends of the said levers are connected by the usual loops with two coupled central levers, $e$ $e'$, the latter of which, $e'$, is a double-armed lever with its outer arm coupled with an intermediate lever, $f$, which is in turn coupled with a lever, $f'$, which is thence coupled with the graduated scale-beam $g$ by the usual connections, as illustrated in Figs. 1 and 2, so that the weight or strain on the platform is thus conveyed through said system of levers to the scale-beam in substantially the same manner as in an ordinary platform-scale.

Now, B indicates the upper clamp-head of the testing-machine, which is mounted on two strong fixed screw-rods, $h$ $h$, which rise from and are fixed to the platform-girders $b'$, so that hence the upper clamp-head bears upon or is sustained upon the platform, and any strain bearing upon the said clamp-head is transmitted through the platform and its levers to the scale-beam, as will be obvious. Now, the upper ends of these fixed screw-rods $h$ $h$ are fixed in the cap or canopy-plate $i$, which plate is secured at its four corners to the tops of four hollow cast-iron columns, $j$, which are also sustained upon the platform, being fixed at the base to the platform-girders $b'$, as seen in Figs. 1, 2, 3, and 4. The four columns $j$ and the cap $i$ hence form a canopy-like inclosure open on all sides, and within which are inclosed the clamp-heads and the straining-screws of the machine, as shown best in Figs. 1, 2, and 4.

Figure 5:
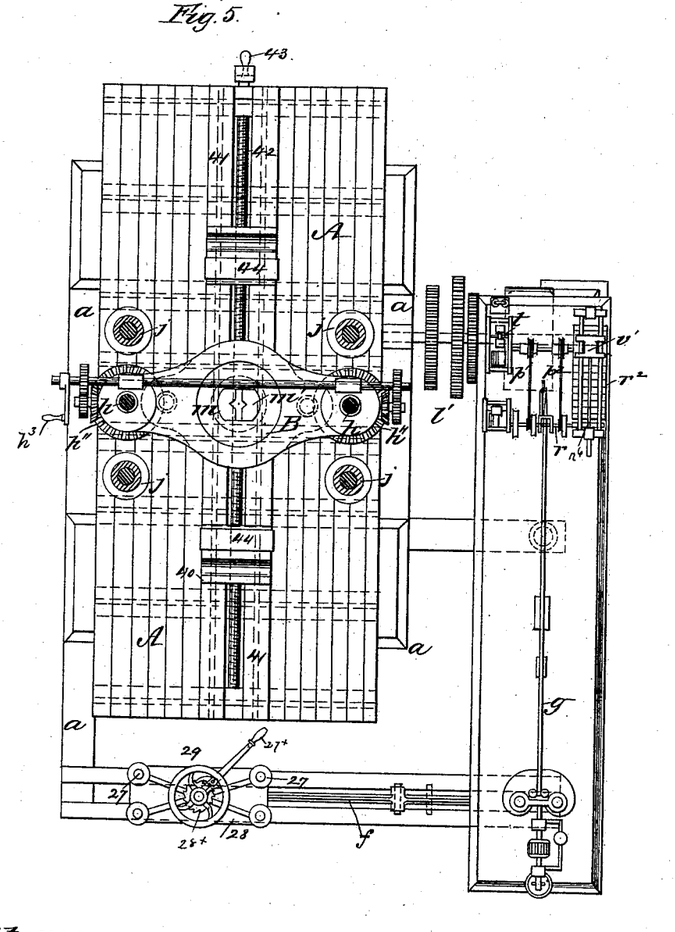
Fig. 5 is a general sectional plan view above the upper clamp-head, and Fig. 6 a fragmentary sectional plan below the latter and above the lower clamp-head.

On reference to Fig. 4 it will be seen that the upper clamp-head, B, rests at each end on large rotary nuts $h'$, which engage with the fixed screw-rods $h$, which nuts are provided with bevel-wheels $h''$, which engage with the gearing, (shown best in Figs. 4, 5, and 1,) which may be operated by the rotary crank $h^3$, whereby the nuts may thus be revolved one way or the other and the clamp-head thus raised or lowered to the desired position on the fixed screws $h$.

Figure 6:
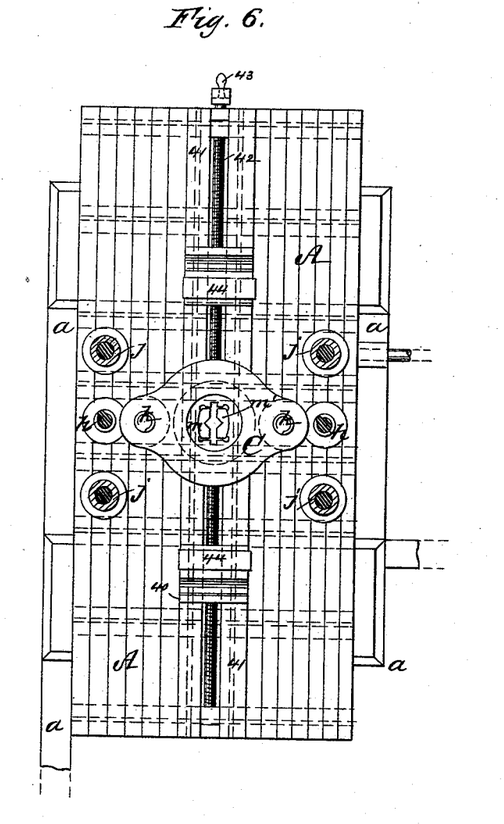

Now, C indicates the lower clamp-head, and $k$ $k$ the straining-screws, which screw through each end of the said head and are disposed in the same plane with the fixed screws $h$ of the upper head, as shown best in Figs. 4, 6, and 2. The shafts of these straining-screws $k$ pass through strong bearing-hubs $k'$, fixed to the frames of the machine, and to their lower ends are fixed the worm wheels $k^2$, the upper sides of which bear against the said hubs, as shown best in Figs. 2, 2¼, and 4. The bearing-face of each of these worm-wheels, as shown in Figs. 2¼ and 2½, is provided with a brass facing, 3, which rests against a steel face, 4, on the bearing-hub, and in the brass facing is a series of concentric circular and radial grooves, 5, for the distribution of oil to the frictional surfaces, which is fed thereto through the holes 6 in the bearing-hubs, thus insuring a flooding of the surfaces with oil and a perfect lubrication thereof. The worm-wheels $k''$ are driven by the worm-shafts $l$, which are driven through a train of gearing, $l'$, from the driving-pulley $l^2$, over which the driving-belt $l^3$ passes from a fast or loose pulley on the primary driving-shaft, $l^4$. A shipper, $l^5$, controls the shifting of the belt from the fast to the loose pulleys $l^7$, and thus controls the application of power to move the straining mechanism or stop the same, as will be understood. The gearing $l'$ is of the ordinary kind for reducing the speed while increasing the power of the force transmitted from the belt to the straining-screws, as will be readily understood without requiring further description, and it will also be readily understood that any other suitable straining mechanism may be used besides that shown without affecting my invention.

The general mechanism of the machine being now described, which is assumed to be of the usual character, I will now describe the novel features of the machine, beginning with the clamp-heads.

Figures 16, 17, 18, 19, 20, 21, 22:
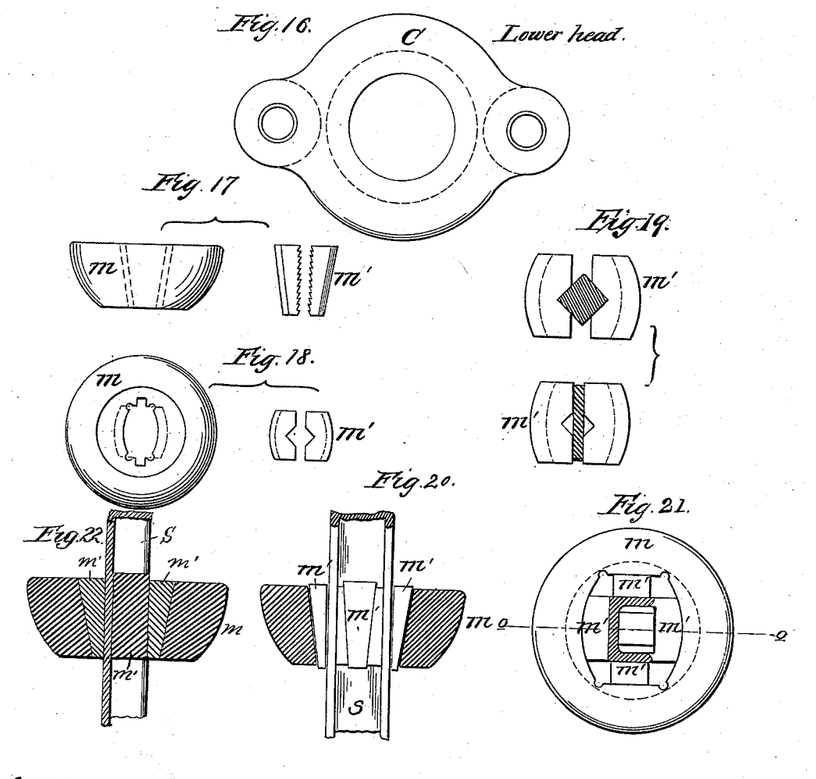

Referring, therefore, to Fig. 4, it will be noted that the clamp-heads B and C are formed with spherical cavities or sockets in which a spherical block or section, $m$, is seated, the form of said socket and block being that of a zone of a sphere cut between the equator and the pole, as shown in said Fig. 4, and also in Figs. 15, 16, 17, 18, 20, and 21. In the center of the spherical blocks $m$ is formed a wedging opening inclining on two opposite sides, in which are jammed the usual clamp-wedges, $m'$, which hold the specimen $s$ in about the usual manner, as shown best in Fig. 4. It will be seen, however, that as the blocks $m$, in which the clamping-wedges and the specimen are held, are spherical and fitted in a spherical socket in the clamps, they are therefore capable of a self-adjusting swiveling motion in all directions, and can hence readily adapt themselves to any slight twist or crookedness in the specimen without affecting the grasp of the wedges; and, furthermore, in case the specimen when wedged in the clamp-heads is not in a straight or parallel position with the straining-screws, it will assume such parallel position as soon as the strain is exerted upon it by the swiveling motion of the spherical blocks $m$, which will act as self-centering or straightening devices, thus insuring a straight and accurate strain upon the specimen, which are important advantages.

Where an ordinary square, round, or flat bar is to be held, the wedges and wedge-socket need incline only on two opposite sides, as shown in Fig. 4 and by full and dotted lines in Figs. 17, 18, and 19, and the gripping-faces of the wedges may be toothed, as in Figs. 4 and 17, or recessed to embrace the angles of the bar, as in Figs. 18 and 19. The same form of wedges may be used to hold a square bar or a flat plate, in the manner shown in Fig. 19. Where, however, the specimen is of many-sided or irregular form, (such as a channel-iron,) as seen in Figs. 20 and 21, the wedge-socket on the spherical blocks is made inclining on all sides and wedges arranged to bear on all sides of the specimen, as shown in said figures, thus getting a firm grasp upon all sides of the channel-iron and insuring an accurate test thereof, which would not be the case if one or more sides were left free. It will now be seen that when the specimen $s$ is properly held in the clamp heads and the straining mechanisms started by slipping the driving-belt from the fast pulley $l^2$ to the loose pulley $l^7$, as seen in Fig. 4, the straining-screws $k$ will be slowly revolved and the lower clamp-head pulled downward, thus pulling upon the specimen and upon the upper clamp-head, which being sustained upon the platform A the strain will hence be transmitted through the platform levers, and thence to the scale-beam $g$, which beam will tend to rise as the strain increases.

Figure 8:
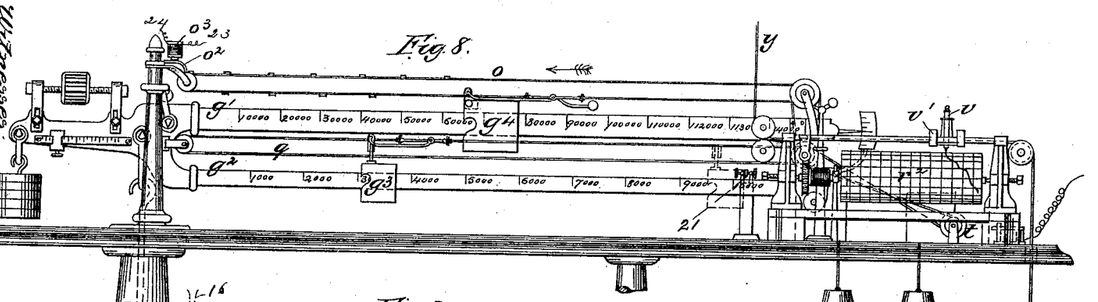
Fig. 8 is an enlarged side elevation of the beam and its adjuncts, including the recording-drum and poise-operating device.

Now, referring to Fig. 8, it will be seen that the beam is of the usual compound kind, having two graduated bars, $g'$ $g^2$, each provided with a sliding poise, $g^4$ $g^3$. The lower bar, with the small poise $g^3$, is graduated, for instance, into divisions of one thousand pounds, while the upper bar, with the large poise, is graduated into divisions of ten thousand pounds, one division on the upper bar being equal to the sum of the divisions on the lower bar, so that the full advance of the small poise to the end of the beam will be equal to the advance of the large poise on one of its divisions. When, therefore, the test is commenced, both poises will be supposed to be at zero, and as the strain on the specimen increases and the beam tends to rise, the small poise should advance out on the beam, so as to offer resistance to the strain, and as the strain increases, the poise should advance progressively, so as to always tend to keep the beam balanced. If the beam rises beyond the balance, the poise should be run out until the beam descends, and if it descends beyond the balance, it should be run back until the balance is restored, and when the small poise has thus traveled to its full length it will be run back, while the large poise will be advanced one step, after which the small poise will again advance, and so on to the end of the test, the advance of the poises being thus progressive with the progress of the strain until the specimen breaks, when the beam will fall and the position of the poises will then show the strain which was exerted to effect the break, as usual in testing-machines of this class. Now, the poises are advanced progressively, as above described, by electrical devices controlled through contacts worked by the rise and fall of the beam, according to the system patented by Henry Fairbanks, No. 110,963, dated January 17, 1871, but with several improvements thereon. In connection with these poise-actuating devices I also use a recording-drum, which advances simultaneously with the poises, and a marker bearing thereon and connected with stretch-clamps on the specimen, so that any stretch of the specimen moves the marker correspondingly, and a diagram is thus recorded, showing the strain and stretch, which devices are also operated electrically with the poise operating devices and embody important novel features.

Figure 7:
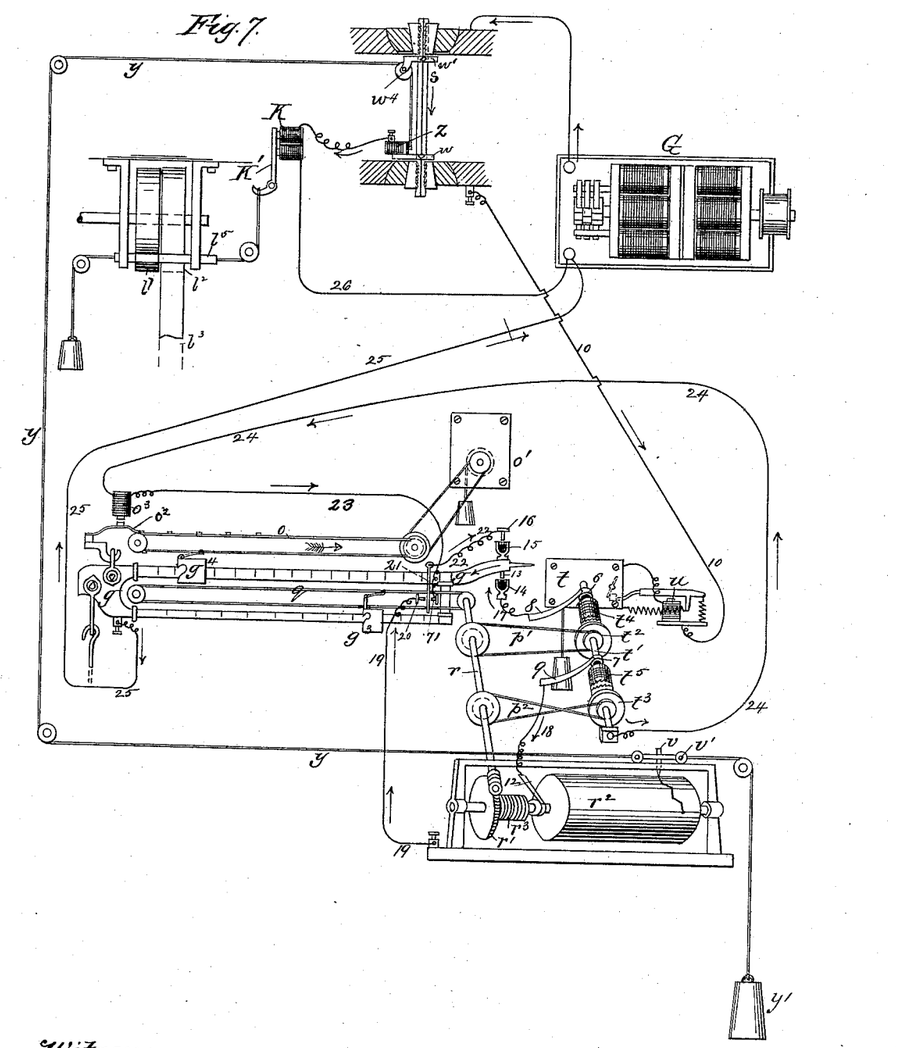
Fig. 7 is a general diagram showing the electrical circuits in the machine and the action of the various parts, and illustrating more fully the novel features of my invention.

I will therefore first refer to Fig. 7, which shows a general diagram of the electric features of the machine. In this view, therefore, $o$ indicates a traveling band connected with the large poise $g^4$, and $o'$ indicates a clock-work or other motor arranged to propel this band in a direction to advance the poise, while $o^2$ is a spring-pawl adapted to engage with teeth on the band, spaced to correspond with the graduations of the bar $g'$, said pawl tending to normally hold the band and poise stationary, except when it is attracted and released by an electro-magnet, $o^3$, of which said pawl is the armature. These parts are also shown in Figs. 8 and 1, to which reference may be made.

Now, $q$ indicates a second traveling band connected with the smaller poise and driven from a rotary shaft, $r$, which shaft is geared with a worm-wheel, $r'$, which turns loosely on the shaft $r^6$ of a recording-drum, $r^2$. The recording-drum is fixed to its shaft, which is mounted at each end on pivot-screws, which are so adjusted as to produce sufficient friction to hold the drum in any position to which it may be turned. The shaft $r$ is provided with two pulleys, $t^2 t^3$, fixed thereon and connected, respectively, by straight and crossed belts $p' p^2$ with corresponding pulleys $t^2 t^3$, which are mounted loosely on a rotary shaft, $t'$, which is revolved by a clock-work, $t$, or other motor.

$u$ is an electro-magnet, which controls the release or stoppage of said clock-work, its armature acting as a stop to the fly or escapement when retracted, and vice versa, as illustrated in the drawings.

Now, upon the shaft $t'$, closely adjoining each pulley $t^2 t^3$, is arranged an electro magnet, $t^4 t^5$, which magnets are fixed to the shaft, while one of their polar ends closely approaches the sides or hubs of the iron pulleys $t^2 t^3$; hence, if either magnet is energized, the corresponding pulley will be attracted closely to it, and thereby magnetically clutched to the shaft, so that as the shaft rotates the attracted pulley will be rotated with it and a corresponding motion imparted to the shaft $r$ to advance or retire the small poise $g^3$. Now, on the shaft of the drum $r^2$ is mounted a similar magnet, $r^3$, also fixed thereto and arranged when energized to attract the loose iron worm-wheel $r'$, and thus clutch it to the shaft, whereas when said magnet is not in circuit the said wheel will be loose on the shaft. Now, the said magnet $r^3$ is always thrown in circuit simultaneously with the magnet $t^5$ when the shaft $r$ is revolved in a direction to advance the poise, and hence the drum is advanced or revolved correspondingly, whereas the magnet $r^3$ is always out of circuit when the magnet $t^2$ is in circuit and the shaft $r$ revolving in the reverse direction to run back the poise, and hence no reverse movement is imparted to the drum $r^2$. The drum hence revolves forward only when the poises advance, and the rotation of the drum is proportionate to the advance of the poise, so that the marker $v$, which bears upon graduated paper wrapped about the periphery of the drum, (see also Figs. 11 and 12,) will hence leave a circumferential line recorded on the graduated paper on the drum, which line will represent the exact weight to which the poise has been advanced, and consequently the strain to which the specimen has been subjected. Now, the marker $v$ is mounted in a little slide or carriage, $v'$, capable of moving on guides $v^2$ longitudinally over the drum, and this marking-slide is connected by a tape, $y$, passing over suitable pulleys to the stretch-clamps $w w'$ on the specimen, so that any stretch of the specimen will pull upon the tape and thus move the marking-slide a similar distance longitudinally over the drum, causing the mark on the graduated surface of the drum to have an irregular or spiral character, the circumferential direction of which will represent strain, while the lateral direction will show the amount of stretch, the paper being of course properly graduated for the purpose; hence by this means a graphic record is made of the test in a simple efficient manner, and after the test is finished the marked paper may be removed from the drum and will present a permanent record of the test for comparison or future reference, which is very desirable in engineering operations.

Figures 11, 13, 14:
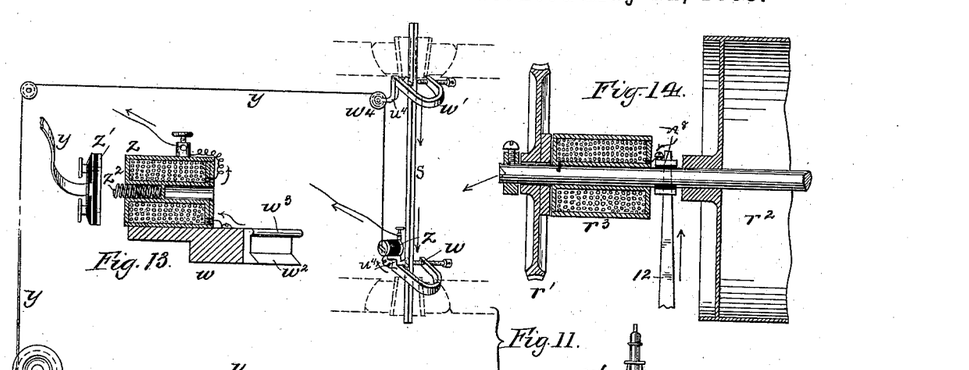
Fig. 11 is an enlarged side elevation of the recording-drum and mountings, including a diagram of the specimen, stretch, clamps, and tape.
Fig. 13 is a sectional detail of the jaw of one of the clamps and of the electromagnet thereon which holds the fixed end of the tape.
Fig. 14 is a sectional detail of the propelled end of the drum and its attachments.
Figure 12:
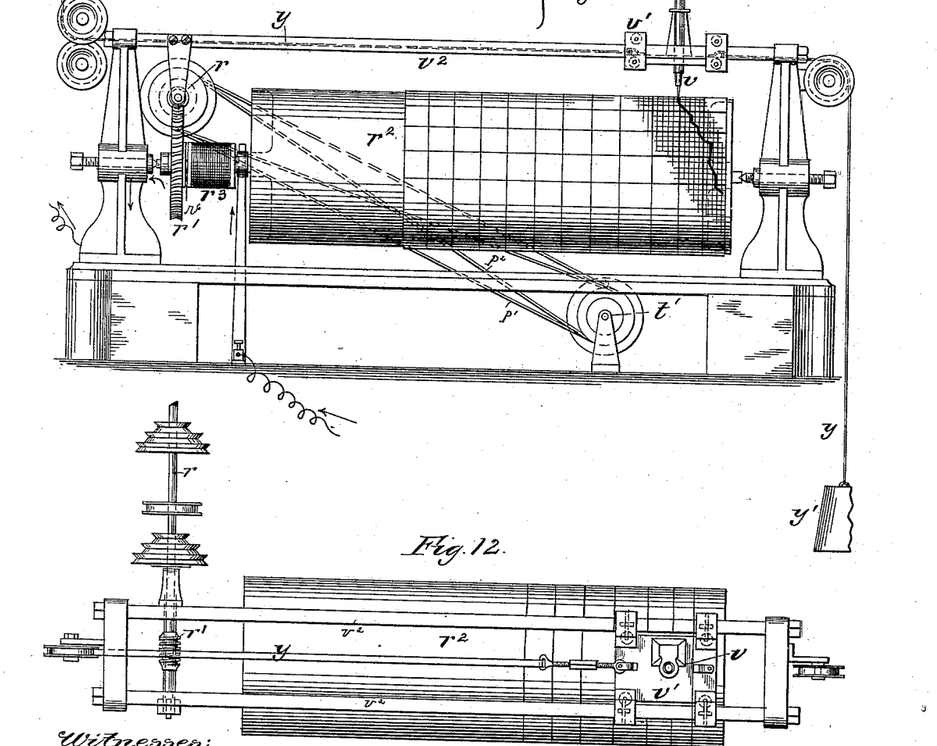
Fig. 12 is a plan of Fig. 11.
Figure 15:
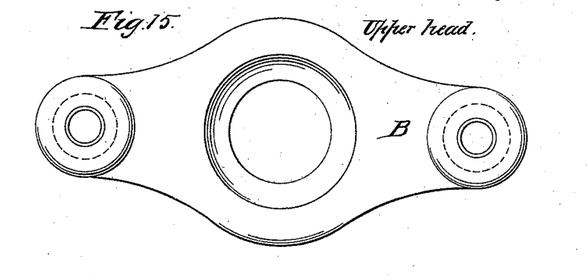

Referring to Figs. 4, 11, and 13, the special construction of the stretch-clamps $w w'$ will be apparent. These clamps consist of a U-shaped spring-bail having a V-shaped gripping-jaw, $w^4$, on one limb of the U and a clamp-screw on the opposite limb, between which the specimen is firmly clamped at a point just where it issues from the jaws or wedges of the clamp-head.

Referring to Figs. 4 and 13, it will be noted that the gripping-jaw of each stretch-clamp is formed with a sharp knife-edge, $w^2$, and a rounding bearing edge, $w^3$, above the same. The specimen when under strain can stretch and move over the round edges $w^3$, whereas the knife-edges $w^2$ bite into the specimen flush with the ends of the clamping-wedges in the clamp-heads, and at the exact line where the specimen issues from the clamp-heads, and hence take a firm hold of the specimen at the very extremities of the length of material under test, so that the full stretch of this length is sure to be recorded by the separation of the clamps, and being thus transmitted through the tape $y$ to the marker $v$, thus rendering the test for stretch accurate, which would not be the case were the clamps to take hold of the specimen at any appreciable distance from its fixed ends.

It will be noted on reference to Figs. 4, 7, and 11 that the upper stretch-clamp carries a little pulley, $w^4$, over which the tape $y$ passes, while the lower stretch-clamp carries an electro-magnet, $z$, having a detachable armature, $z'$, (see Fig. 13,) to which the fixed end of the tape is secured, while to the opposite end of the tape is attached a weight, $y'$, which keeps the tape taut.

When the apparatus is in action, the magnet $z$ will be energized and will forcibly attract its armature, and thus hold the fixed end of the tape firmly to the lower clamp, whereas when the circuit of the magnet is broken by the breakage of the specimen, as will be hereinafter described, the armature will be retracted and be thrown off by a light spring, $z^2$, (see Fig. 13,) thus instantly releasing the tape and stopping the advance of the stretch-mark at the instant the specimen breaks.

The general mechanism and electrical features being now explained, I will explain the direction of the circuit and the manner in which the several magnets are thrown into or out of circuit by the movements of the beam and the action of the specimen.

Figure 9:
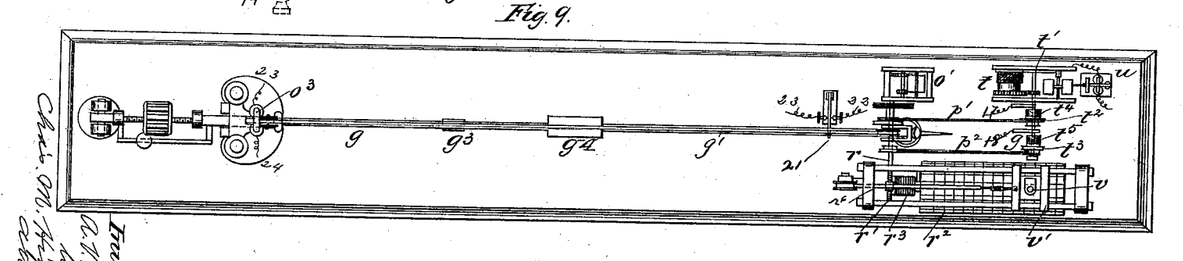
Fig. 9 is a plan of Fig. 8.

Referring, therefore, to the general diagram, Fig. 7, and also to Figs. 4 and 1, G indicates the electric source or generator, one pole—say the positive—of which connects with the upper clamp-head, B, through wire $G'$ and one of the fixed screw-rods $h$, as seen in Figs. 1 and 4. Now this upper clamp-head is electrically isolated from the lower clamp-head and from the rest of the machine, but is in metallic connection with the fixed screw-rods $h\ h$, which are insulated at top and bottom from the rest of the machine, as indicated by solid black shading $h^4$ in Fig. 4. When, therefore, the metallic specimen $s$ is clamped between the heads, it forms an electrical connection between them, through which the current flows from the upper head to the lower head. The current thence continues from the lower clamp-head, as shown in Fig. 7, by the wire 10 to the releasing-magnet $u$, and from the magnet to the frame of the clock-work $t$, and thence to the shaft $t'$. Now, one end of the clutch-magnets $t^4\ t^5$ is connected with the shaft $t'$, while the other end is connected to insulated metallic collars 6 7 on said shaft, on which collars metallic brushes 8 9 bear. The clutch-magnet $r^3$ on the shaft of the recording-drum is connected in a similar way, as shown in Fig. 14, one end of its coil being connected to the shaft and the other to an insulating-collar, $r^3$, on which the brush 12 bears. Now, the index-tip of the beam, as seen in Fig. 7, is provided with a downwardly-projecting contact-point, 13, arranged to project into a receiving-cup, 14, fixed below the same, while an upwardly-projecting mercury-cup, 15, on the tip of the beam projects toward a fixed contact-point, 16, above the beam, thus forming two electrical contacts, the lower one of which will be closed when the beam falls, while the upper one will be closed when the beam rises, whereas both will be open when the beam is in balance. Now, the brush 8 of the clutch-magnet $t^4$ is connected by wire 17 with the lower cup, 14, while the brush 9 of the magnet $t^5$ is connected by wire 18 with the brush 12 of the recording-drum, and from the shaft or bearing of the drum a wire, 19, proceeds and connects to a contact-point, 20, against which normally bears a contact-tongue, 21, whose tip projects into the path of the small poise $g^3$ when at the extremity of its travel. (See also Figs. 8 and 9.) This contact-tongue 21 connects by wire 22 with the upper contact-point, 16, of the beam-contacts. The opposite seat or stop point, 71, of the contact-tongue 21 connects by wire 23 with one end of the releasing-magnet $o^3$, the opposite end of which connects by wire 24 with the shaft $t'$. The beam $g$ is itself connected by return-wire 25 with the negative pole of the generator. Now, the above describes the general circuit of the poise-operating and recording devices which are controlled by the movements of the beam, and in which is also included the specimen. This circuit, however, does not include the tape-holding magnet $z$, which, as shown in Fig. 7, is in a shunt or separate branch circuit, in which is also included another magnet, K, not heretofore described, but which serves to hold the belt-shipper $l^5$ in its driving position, in the manner shown in Figs. 7, 4, and 1, or by any equivalent means, so that when the magnet is decircuited it will release the hooked trigger-armature $K'$, and thereby allow the weighted belt-shipper to shift the belt on the loose pulley $l'$, thus stopping the straining mechanism. Now, on reference to Fig. 7, it will be seen that this shipper-magnet, as well as the tape-magnet $z$ is in a direct branch circuit with the generator through the specimen $s$ and the return-wire 26, which is independent of the larger circuit through the specimen, the wires 10, 25, and the poise-operating and recording devices, so that the breaking and closing of the latter circuit during the operation of the poises will not affect the magnets K $z$, whereas the breaking of the specimen will break all the circuits and bring all parts of the apparatus to rest, and thus finish the test.

The general action of the apparatus will now be readily understood.

Referring, therefore, to Figs. 7, 4, and 1, I will assume that the specimen is properly clamped in position between the heads, that the straining mechanism is started, and that the specimen is under strain, the poises being at zero on the beam, and the beam hence raised by the strain, and the upper contacts, 15 and 16, closed. I will also assume that the circuit is closed at the generator, and that the armature of the shipper-magnet is therefore attracted and arranged to hold the belt in its driving position, as illustrated; also, that the marker $v$ and the recording-drum are properly set zero, and the fixed end of the tape $y$ attracted and held by the magnet $z$. The test, therefore, will now commence, the straining mechanism will put a gradual strain on the specimen, and this will raise the beam and close the upper contacts, 15, 16. As soon as the contacts are thus closed, the poise $g^3$ will immediately travel out on the beam, for the current will now flow from the lower clamp-head by wire 10 to magnet $u$, thus releasing the clock-work and revolving the shaft $t'$. The current passing from the clock-work to shaft $t'$ will flow through the magnet $t^5$, collar 7, brush 9, wire 18, brush 12, and through the magnet $r^3$ of the recording-drum, thence through the shaft and bearing of the drum by wire 19 to contacts 20 21, and by wire 22 to the contacts 15 16, and thence through the beam by wire 25 back to the generator. The clutch-magnet $t^5$, being thus magnetized and attracted to the pulley $t^3$, will cause the belt $p^2$ to revolve the shaft $r$ in a direction to move the poise $g^3$ out on the beam, thus putting resistance upon the straining mechanism and weighing the strain, and the rotation of the shaft $r$ to move out the poise will simultaneously revolve the recording-drum $r^2$ through the worm-gearing $r'$, which is now clutched to the drum-shaft by the magnetized clutch $r^3$, as already described, and the movement of the drum will therefore record the advance of the poise, as before described. As soon as the poise is moved out on the beam beyond the point of balance the beam will fall, and thus open the contacts 15 16, and therefore throw the magnets $t^5$ and $r^3$ out of circuit, and thus stop the advancing of the poise and the rotation of the drum $r^2$. The poise will therefore remain stationary on the beam if the beam remains in a state of balance between the contacts, and while the beam is thus in balance with both upper and lower contacts open, the releasing-magnet $u$ will also be cut out of circuit and the clock-work $t$ and the shaft $t'$ stopped. If, however, the beam falls far enough to close the lower contacts, 13 14, then the magnet $u$ will be again in circuit, and also the clutch-magnet $t^4$, which will impart a reverse rotation through the belt $p'$ to the shaft $r$, and thus run the poise back on the beam until the balance-point is reached, when both contacts will be again opened and the mechanism stopped. When the lower contacts, 13 14, are closed, as above set forth, it will be seen that the current will flow through the magnet $u$, clock-work $t$, and shaft $t'$, as before, but will continue through the magnet $t^4$, collar 6, spring 8, wire 17, to contacts 14 13, thence through the beam and return as before; hence while the shaft $r$ revolves reversely during the passage of the current and revolves the worm-wheel $r'$ of the recording-drum reversely it will impart no reverse movement to the drum, as its clutch-magnet $r^3$ is out of circuit, and hence the wheel $r'$ revolves loosely on the driving-shaft and the drum is held stationary by the friction on its pivot-bearings. If the poise is thus moved back beyond the balance, or if the strain on the specimen and beam increases, then the beam will again rise and close the upper contacts, 15 16, and this will cause the poises and the drum to advance, in the manner before described, until the balance is again reached. When by these successive advances the small poise $g^3$ finally reaches the end of its travel on the beam, it will strike the contact-tongue 21 and press it over against its opposite stop, thus breaking contact with the wire 19, and hence throwing the magnets $r^3$ and $t^3$ out of circuit, and thus stopping the advance rotation of the shaft $r$. At this condition of parts, the beam being presumed to be raised and the upper contacts, 15 16, closed, the releasing-magnet $o^3$ will now be in circuit, and it will attract its armature $o^2$ and release the traveling band $o$ and clock-work $o'$, which will therefore advance the large poise $g^4$ slowly out on the beam. The current will therefore now flow from wire 10, as before, through magnet $u$, clock-work $t$, shaft $t'$, wire 24, magnet $o^3$, wire 23, contacts 17 and 21, wire 22, contacts 15 16, and through beam $g$ back by return-wire 25. At the instant, therefore, that the large poise commences to move out, the beam will fall and open the contacts 15 16 and close the contacts 14 13. The opening of contacts 15 16 will of course throw the magnet $o^3$ out of circuit and allow the pawl-armature $o^2$ to fall into position and engage the next tooth on the traveling band $o$, so as to thereby stop the band $o$, clock-work $o'$, and poise $g^4$ as soon as the poise has advanced to one graduation. As soon, however, as the lower contacts, 14 13, close, the clutch-magnet $t^4$ will be in circuit, as before described, and hence the band $p'$ will revolve the shaft $r$ in a direction to run back the small poise $g^3$ to zero, and as soon as the small poise commences to run back the contacts 20 21 will be closed to their normal position.

It will be understood that the rates of motion of the bands $o$ and $q$ will be such that by the time the large poise $g^4$ is run out to the end of one graduation the small poise $g^3$ will have traveled back to or nearly to its zero, so that the weight on the beam will be always applied in a slow progressive manner and not in sudden large increments, which would be the case if the small poise was to remain at the end of the beam while the large poise was running out one graduation. After the large poise is thus run out one graduation, and after the small poise has been run back to zero or to the balance-point, the small poise will again advance in successive steps, as before, according as the beam rises and falls and opens and closes the upper and lower contacts, as before described, until sufficient strain has been applied to reach the limit of strength of the specimen. When, therefore, this point is reached, and as soon as the specimen breaks, all the electric circuits will be instantly broken and all the magnets demagnetized, and hence the tape $y$ will be released and the advance of the marker stopped at its position at the moment of break. The shipper $l^5$ will be at the same instant released and the belt shifted onto the loose pulley, thus stopping the straining mechanism, and simultaneously the poise-operating and recording mechanism will come to rest, and the position of poise will indicate the strain at which the specimen broke. Turning now to the drum a record and diagram will be found showing the amount of this strain, as well as the amount of stretch and the nature and progress of the stretch which the specimen exhibited, thus presenting most important advantages in testing operations.

It will be readily observed that a great advantage accrues from having the electric circuit pass through the specimen under test, which is original with me and a leading feature of this application, as all parts of the apparatus may therefore be controlled by the action of the specimen, and on the instant of break all the mechanism will be brought to rest. It is not absolutely necessary, however, to have the current pass through the specimen under test, as it may be passed through a light wire or any suitable conductor extending between the clamp-heads, so that as soon as the specimen breaks the strain will come upon the conductor and also break that; but while this will serve some of the purposes described it will not serve all the purposes so well as having the current pass directly through the specimen, and through that only, as will be readily appreciated.

Figure 10:
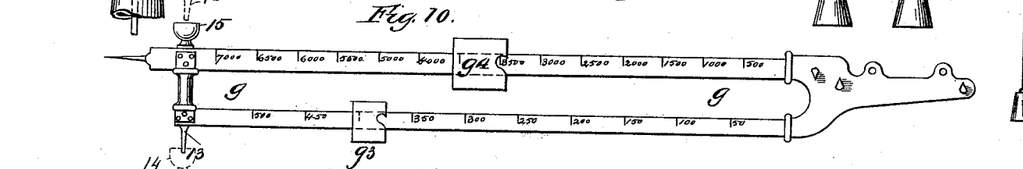
Fig. 10 is a reverse view of the beam detached, showing the graduations on the reverse side.

It will be readily understood that it would not be desirable to use the large clamp-heads and the large straining mechanism for testing small specimens breaking at a few hundred or thousand pounds, and hence I have embodied with the large machine an auxiliary straining device and clamps adapted for small tests, but which is connected with the same beam and weighing and recording machine as is the large apparatus for heavy tests. This auxiliary tester will therefore be readily understood by referring to Figs. 1, 2, and 5, in which 27 represents a cluster of four uprights or supporting-columns rising from the frame-work of the machine near the beam end and supporting a head, 28, through which passes a straining-screw, 29, which slides on a key in the head, and on which is engaged a nut provided with a hand-wheel, $28^\times$, and a ratchet-lever, $27^\times$, as ordinarily used in small testing-machines, whereby the nut may be slowly revolved with great leverage to move the screw. One clamp-head, 30, is jointed to the lower end of the straining-screw, and the opposite clamp-head, 31, is jointed to a supporting and balancing lever, 32, provided with counterpoising-weights 33, and this clamp-head is also connected by a link, 63, and ordinary loop, 64, and pivot-connections with the intermediate levers, $f$, which connect with the beam. It will hence be seen that a small specimen, 61, may be easily placed in the clamps 30 31, and the same put under strain by moving the straining-screw by the hand-lever, 62, shown, and that this strain will be communicated to the beam, and the poise and recording mechanism of the machine will be operated in the same way as already described for the heavy tests and the test recorded in the before-described manner, provided, of course, that the circuit-connections were previously made with the generator and recording devices substantially as shown in Fig. 7. In this way a great deal of time will be saved in testing small specimens, as the test can be performed much more quickly and conveniently in the minor machine, whereas it would take a good deal of time and trouble to test the small specimen in the main machine on account of its adaptability for very heavy work. In thus testing small specimens, as described, it will not be generally required to employ the strain and stretch recording devices; but the strain can simply be read from the positions of the poises on the beam; but, if required, of course the strain and stretch may be recorded in the same manner as described in referring to the main machine. Where small tests are thus made with the auxiliary machine it will of course be desirable, if not necessary, to employ a smaller set of graduations on the beam from that used for the heavy tests, and for this purpose the back face of the beam is graduated into graduations of small value adapted for the small tests, as fully shown in Fig. 10, so that by the combined features described small and large tests may be conveniently made in the same machine with the same scale mechanism.

When tests for transverse strength are to be made, as shown by dotted lines in Fig. 3, the bar 53 to be tested is placed longitudinally above the platform and below the lower clamp-head, being supported at each end on the adjustable blocks or anvils 40, while a knife-edge on the center of the lower clamp-head will bear on the middle of the beam in the usual manner, as indicated by dotted lines. The anvils 40 are supported on two I-beams, 41, placed close together on the top of the platform, and are capable of sliding thereon and of being adjusted to or from each other and always equidistant from the center line of the clamp-heads by means of a right and left threaded screw-shaft, 42, which is supported between the beams and revolved by the crank 43, and which engage with nuts fixed to the base of the anvils, as fully shown in Figs. 1, 3, 4, and 5, thus enabling the position of the anvils to be adjusted to the length of the bar to be tested in the manner usually employed. The bar will not, however, rest directly on the anvils, as heretofore, but (see Fig. 3) upon tilting or rolling blocks 44, preferably of half-round section, which fit into half-round grooves in the top of the anvils. By this means when the bar bends under the strain of the test the blocks 44 will slightly rock or tilt to accommodate themselves to the bend of the bar, and thus prevent the bar from sliding on its point of support on the anvil, as heretofore, so that the points of support of the bar always remain at the same distance apart throughout the test, and this, therefore, conduces to great accuracy and avoids the slight errors which exist when the points of support slide during the test, as will be readily appreciated.

It will be noted that in the recording devices shown the circumferential motion of the drum represents strain, while the longitudinal motion of the marker represents stretch; but it is obvious that these relations might be reversed without affecting the result, if preferred.

Instead of employing electro-magnets in the positions shown, any equivalent or suitable electric-motor device may be so used; but no other device is considered so suitable as a magnet.

Instead of having the clutch-magnets $t^4$ $t^5$ fixed to and revolving with the shaft $t'$ and arranged to clutch the pulleys $t^2$ $t^3$ by direct attraction, the magnets may be fixed separate from the shaft and arranged to attract armature levers, which will act to clutch the pulley to the shaft, if preferred.

I do not claim the parts 40 and 41 in this application.

What I claim as my invention is—

1. The combination, in a testing-machine, with the two specimen-holding clamp-heads electrically insulated from each other, of a frangible electrical conductor extending between and fixed to the heads, and an electrical circuit completed through said conductor and through an electric-motor device controlling one or more active parts of the testing-machine, whereby the breakage of said conductor at the completion of the test will break the circuit and bring said active parts to rest, substantially as herein set forth.

2. The combination, with a testing-machine, of an electric-motor device controlling one or more active parts of the machine and an electric circuit completed through the specimen under test and through said motor device, arranged and operating substantially as herein set forth, whereby the breakage of the specimen will break the circuit and bring the machine to rest.

3. The combination, with a testing-machine, of a magnet or electric-motor device arranged to control the driving of the straining mechanism and an electric circuit energizing said magnet and completed through the specimen under test, and arranged and operating substantially as herein set forth, whereby the breakage of the specimen will break the circuit and automatically stop the straining mechanism.

4. The combination, in a testing-machine, with a device for marking and recording the stretch of the specimen, of a clamp affixed to each end of the specimen and provided with a pulley with a tape or connection extending at one end from the marker passing through the said pulley on one clamp and fixed at the opposite end to the other clamp, substantially as and for the purpose set forth.

5. The combination, in a testing-machine, of a device for marking and recording the stretch of the specimen, a tape or connection extending from the marker to clamps upon the specimen, and an electro-magnet on said specimen, arranged to hold the fixed end of said tape with an electric circuit completed through said specimen and magnet, whereby the breaking of the specimen breaks the circuit and instantly releases the tape and stops the advance of the stretch-mark coincident with the break of the specimen.

6. In a testing-machine, the combination, with the clamp-heads to hold the specimen and a specimen extending between and held by the same, of a stretch-clamp, such as $w$ or $w'$, bound onto the specimen near the head and formed with the knife-edge $w^2$, arranged to grasp the specimen only at the extremity of the part under test, or at the line where it issues from the clamp-heads, substantially as and for the purpose set forth.

7. In a testing-machine, a stretch-clamp, such as $w$ or $w'$, having the knife-edge $w^2$ and round edge $w^3$, substantially as and for the purpose set forth.

8. In a testing-machine, a clamp-head, such as B or C, formed with a central spherical socket whose center is coincident with the line of the specimen, or nearly so, in combination with a spherical universally-swiveling block, $m$, fitted in said socket, and means to secure the specimen in said block, substantially as herein set forth.

9. In a testing-machine, the combination, with the clamp-head B or C, having a central spherical socket, of the universally-swiveling block $m$, fitted therein, and the clamp-wedges $m'$, fitted in a central cavity in said block, substantially as and for the purpose set forth.

10. In a testing-machine, the combination, with the specimen, of a clamp-head provided with a clamp socket inclined on more than two sides, with clamping-wedges driven in between said sides and between all sides of the specimen held therein, substantially as and for the purpose set forth.

11. In a testing-machine, a double scale-beam provided with a main and a minor poise, the former being movable in successive steps or graduations corresponding to the full travel of the latter, in combination with an electrical contact arranged in the path of the minor poise at the end of its movement, an electro-magnet controlling the movement of the main poise in its successive steps, and an electric circuit passing through said magnet and contact, arranged and operating substantially as and for the purpose set forth, whereby said contact and circuit are closed upon the arrival of the minor poise at the end of the beam and the magnet is energized, and the main poise thereby caused to be moved out one step, as set forth.

12. In a testing-machine, the combination, with the weighing-beam and its movable poise and a rotary driving-shaft, such as $t'$, and a clutch-pulley thereon for imparting motion to such poise, of an electro-magnet arranged when in circuit to attract or clutch said pulley to the shaft, with an electric circuit passing through said magnet and through contacts operated by the rise and fall of the beam, whereby the closing of one of said contacts by the rise and fall of the beam will energize the magnet and cause the pulley to be clutched to and revolved with the shaft to impart motion to the poise, substantially as herein set forth.

13. In a testing-machine, the combination, with the weighing-beam and its movable poise and a rotary driving-shaft for imparting motion to such poise, of an electro-magnet fixed to and revolving with said shaft, and a clutch-pulley arranged loosely on said shaft and forming an armature to said magnet and operatively connected to the poise, with an electric circuit passing through such magnets and through contacts operated by the rise and fall of the beam, substantially as and for the purpose herein shown and described.

14. In a testing-machine, the combination, with the weighing-beam and its movable poise $g^3$, and with the recording-drum $r^2$, of the rotary driving-shaft $t'$ and a suitable motor to propel the same, of the clutch-magnets $t^4 t^5$ and the pulleys $t^2$ and $t^3$ on said shaft, arranged to impart relatively reverse movements to the poise, with the clutch-magnet $r^3$ and driving-wheel $r'$ on the said drum, with an electrical circuit passing through said magnets and through contacts operated by the rise and fall of the beam, and so arranged that the said magnet $r^3$ of the recording-drum is always in circuit to revolve the drum when the poise is advancing, but is out of circuit to keep the drum stationary when the poise is retreating, substantially as and for the purpose set forth.

15. The combination, in a testing-machine, with a weighing-beam, $g$, and its movable poise $g^3$ and electrical contacts operated by the rise and fall of the beam, of the motor $t$ and its releasing-magnet $u$, the driving-shaft $t'$ and its clutch-magnets $t^4 t^5$ and its pulleys $t^2$ $t^3$, arranged to impart relatively reverse movements to the poise, and an electrical circuit passing through said contacts and magnets and so arranged that when the beam is in balance said contacts and said circuit will be open and the said magnets, motor, shaft, and pulleys at rest, but when the beam rises or falls one of said contacts will be closed and the corresponding parts energized to move the poise forward or backward, substantially as herein shown and described.

16. A compound testing-machine adapted for both light and heavy tests, constructed with one weighing-beam and a major and a minor set of clamp-heads and straining mechanism, both sets of clamp-heads being connected with the same beam, having major and minor graduations thereon corresponding to the clamp-heads, substantially as herein shown and described.

ARTHUR V. ABBOTT.

Witnesses:
CHAS. M. HIGGINS,
ROBERT M. CURTISS.